United States Patent
Zahavi

(10) Patent No.: US 6,622,221 B1
(45) Date of Patent: Sep. 16, 2003

(54) WORKLOAD ANALYZER AND OPTIMIZER INTEGRATION

(75) Inventor: William Z. Zahavi, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 424 days.

(21) Appl. No.: 09/663,540

(22) Filed: Sep. 15, 2000

Related U.S. Application Data

(63) Continuation-in-part of application No. 09/641,227, filed on Aug. 17, 2000, which is a continuation-in-part of application No. 09/641,224, filed on Aug. 17, 2000.

(51) Int. Cl.[7] .............................................. G06F 12/00
(52) U.S. Cl. ...................... 711/154; 711/114; 711/165; 703/2; 703/21; 703/22
(58) Field of Search ................................ 711/114, 154, 711/170, 165; 703/2, 21, 22

(56) References Cited

U.S. PATENT DOCUMENTS

| | | | | |
|---|---|---|---|---|
| 5,295,244 A | * | 3/1994 | Dev et al. .................... | 345/853 |
| 5,598,532 A | * | 1/1997 | Liron ............................ | 703/2 |
| 5,640,595 A | * | 6/1997 | Baugher et al. .............. | 710/10 |
| 5,704,012 A | * | 12/1997 | Bigus .......................... | 706/19 |
| 6,061,761 A | | 5/2000 | Bachmat | |
| 6,085,338 A | * | 7/2000 | Levine et al. ................. | 714/47 |
| 6,088,766 A | | 7/2000 | Bachmat et al. | |
| 6,421,719 B1 | * | 7/2002 | Lewis et al. ................ | 709/224 |
| 6,493,810 B1 | * | 12/2002 | Pang et al. .................. | 711/170 |
| 2001/0013084 A1 | * | 8/2001 | Barve et al. ................ | 711/113 |

OTHER PUBLICATIONS

U.S. Ser. No. 09/641,227, "Method and Apparatus for Storage System Metrics Management and Archive", filed Aug. 17, 2000.

U.S. Ser. No. 09/641,224, "Method for Storage and Manipulation of Storage System Metrics" filed Aug. 17, 2000.

* cited by examiner

Primary Examiner—Hiep T. Nguyen
(74) Attorney, Agent, or Firm—Choate, Hall & Stewart

(57) ABSTRACT

Described are techniques used in connection with evaluating the performance of proposed swap plans in accordance with past performance data collected. Data is gathered for a first arrangement of a data storage devices for a period of time. A proposed modification to the first arrangement, such as swapping logical volumes of data on one or more storage devices, is produced. A performance estimation is produced using a modeling technique, past performance data, and the proposed modification. The proposed modification may be produced using an automated tool, such as an optimizer, or other input means, such as by a user viewing actual performance data to determine obvious LV swap candidates. The proposed modification may be rejected, or accepted and implemented subsequent to viewing the performance estimation.

81 Claims, 12 Drawing Sheets

WORKLOAD ANALYZER AND OPTIMIZER INTEGRATION

CROSS REFERENCE TO RELATED APPLICATIONS

This application is a continuation-in-part of pending U.S. patent application Ser. No. 09/641,227 filed on Aug. 17, 2000, and is a continuation-in-part of pending U.S. patent application Ser. No. 09/641,224 filed on Aug. 17, 2000.

BACKGROUND

1. Technical Field

This application generally relates to computer systems, and more particularly to computer system performance.

2. Description of Related Art

Computer systems may include different resources that may be used by one or more processors. Resources and processors in a computer system may be interconnected by one or more communication connections. These resources may include, for example, data storage devices such as the Symmetrix family of data storage systems manufactured by EMC Corporation. These data storage systems may be coupled to one or more processors and provide storage services to each processor. An example data storage system may include one or more data storage devices, such as those of the Symmetrix family, that are connected together and may be used to provide common data storage for one or more processors in a computer system.

A processor may perfom a variety of data processing tasks and operations using the data storage system. For example, a processor may perform basic system I/O operations, such as data read and write operations and also administrative tasks, such as data backup and mirroring operations. In connection with the I/O operations, a data storage system may include a data storage optimizer used in connection with improving device performance. The data storage optimizer may perform a variety of tasks, for example, determining what logical volumes (LVs) may be candidates for swapping to increase performance of the data storage system in accordance with one or more predetermined criteria, such as minimizing response time associated with an I/O request. A "swap plan", as may be produced by a data storage optimizer, may identify one or more pairs of LVs having data included therein to be swapped.

Once the data storage optimizer produces a swap plan, it may be time consuming to implement, for example, since scheduling swapping of data on LVs may be performed as a background task. Due to the time and resources as may be associated with performing an LV swap optimization, it may be advantageous and desirable to provide for an option to accept or reject a swap plan, as may be formulated by a data storage optimizer.

One problem with this is that an implementation of the data storage optimizer may not include an evaluation technique for determining whether to implement a swap plan. Additionally, existing data storage optimizers may not provide for optional implementation of a swap plan. It may also be advantageous and desirable to provide for alternative swap plans to be evaluated and implemented besides those produced by the data storage optimizer.

Thus, it may be advantageous to provide a technique for evaluating and optionally implementing a suggested swap plan as may be produced by a data storage optimizer or other manual or automated technique.

SUMMARY OF THE INVENTION

In accordance with principles of the invention is a method and computer program product for evaluating performance of at least one data storage device. Actual performance data associated with the at least one data storage device may be gathered. A modification is determined in accordance with performance of the at least one data storage device. Estimated performance is modeled of the at least one data storage device in connection with the modification and the actual performance data. In response to modeling, it is determined whether to implement the modification.

In accordance with another aspect of the invention is a computer system. Included is a computer system resource that is used by at least one host. A work analyzer performs performance analysis of the computer system resource in accordance with actual performance data. A modeler estimates performance of the computer system resource in accordance with a modification associated with the computer system resource. An evaluator determines whether to implement the modification.

In accordance with yet another aspect of the invention is a method executed in a computer system for performing performance analysis. Data operations are performed in connection with a computer system resource by at least one system host. Performance analysis is performed by a work analyzer of the computer system resource in accordance with actual performance data. Performance of the computer system resource is estimated by a modeler in accordance with a modification associated with the computer system resource and a portion of the actual performance data. An evaluator determines whether to implement the modification.

In accordance with yet another aspect of the invention is a method and computer program product for evaluating performance of at least one data storage device. Actual performance data associated with the at least one data storage device is gathered. A modification is determined in accordance with performance of the at least one data storage device. Estimated performance of the at least one data storage device in connection with said modification and said actual performance data is modeled. The estimated performance is presented in connection with said modification in a visual form to a user. In response to presenting, it is determined whether to implement the modification.

In accordance with another aspect of the invention, is a method and computer program product for determining whether to implement a swap plan. Data operations are performed in connection with at least one data storage device included in a computer system. Performance data in connection with said data operations is collected. A swap plan is determined in accordance with a first portion of performance data associated with the data operations. A first response time is estimated using a second portion of said performance data. The first response time is associated with the at least one data storage device without implementing the swap plan. A second response time is estimated using said second portion of the performance data. The second response time is associated with the at least one data storage device with the swap plan. A determination is made as to whether to implement the swap plan in accordance with the first and said second response times.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF PREFERRED EMBODIMENT

Figure 1:
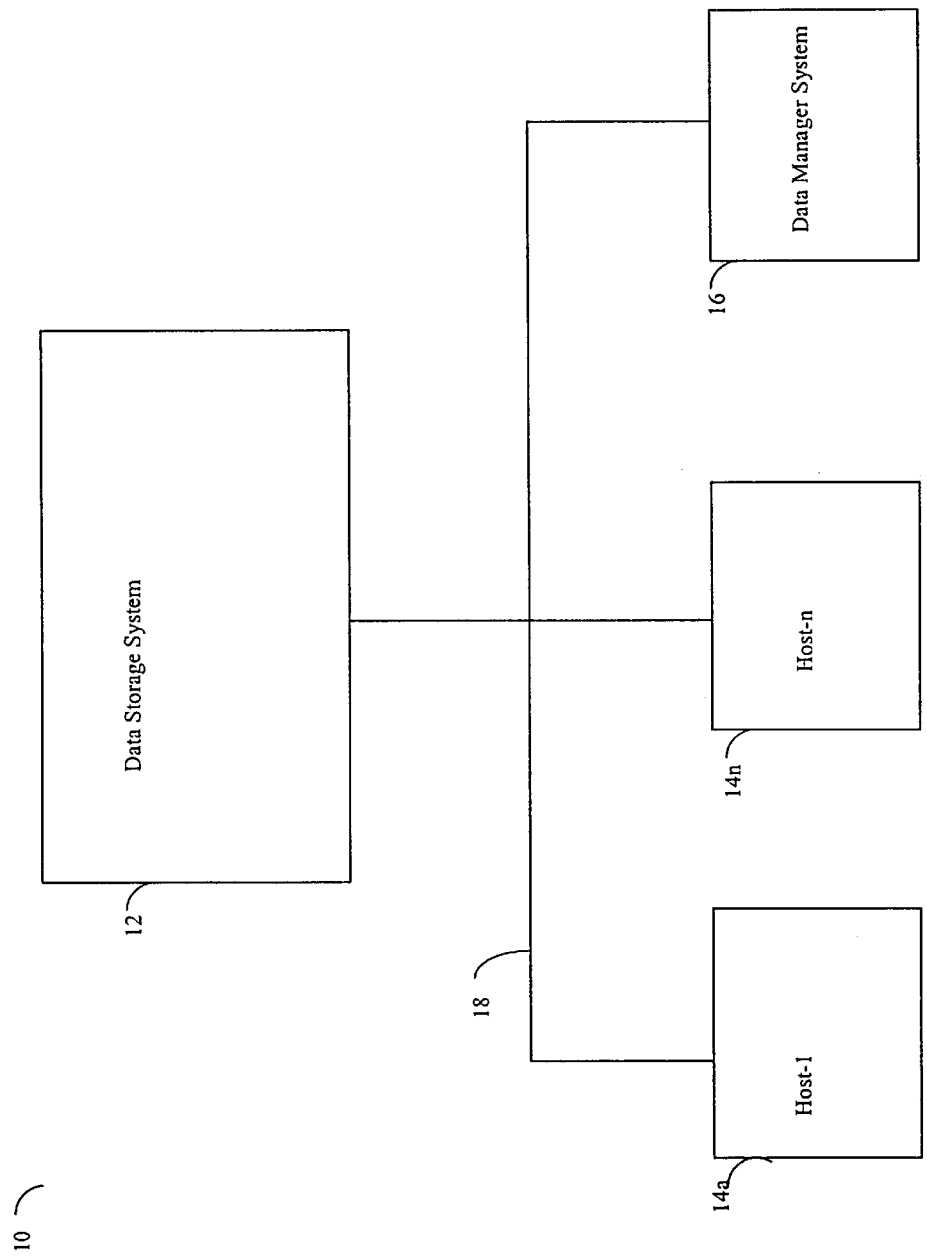
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations. The communication medium 18 may be any one of a variety of networks or other type of communication connections as known to those skilled in the art. For example, the communication medium 18 may be the Internet, an intranet, or other network connection by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, or Fiber Channel. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue an I/O request to the data storage system 12 to perform a data operation. For example, an application executing on one of the host computers 14a–14n may perform a backup, mirroring or other administrative operation and may do so while performing I/O requests to the data storage system 12.

Figure 2:
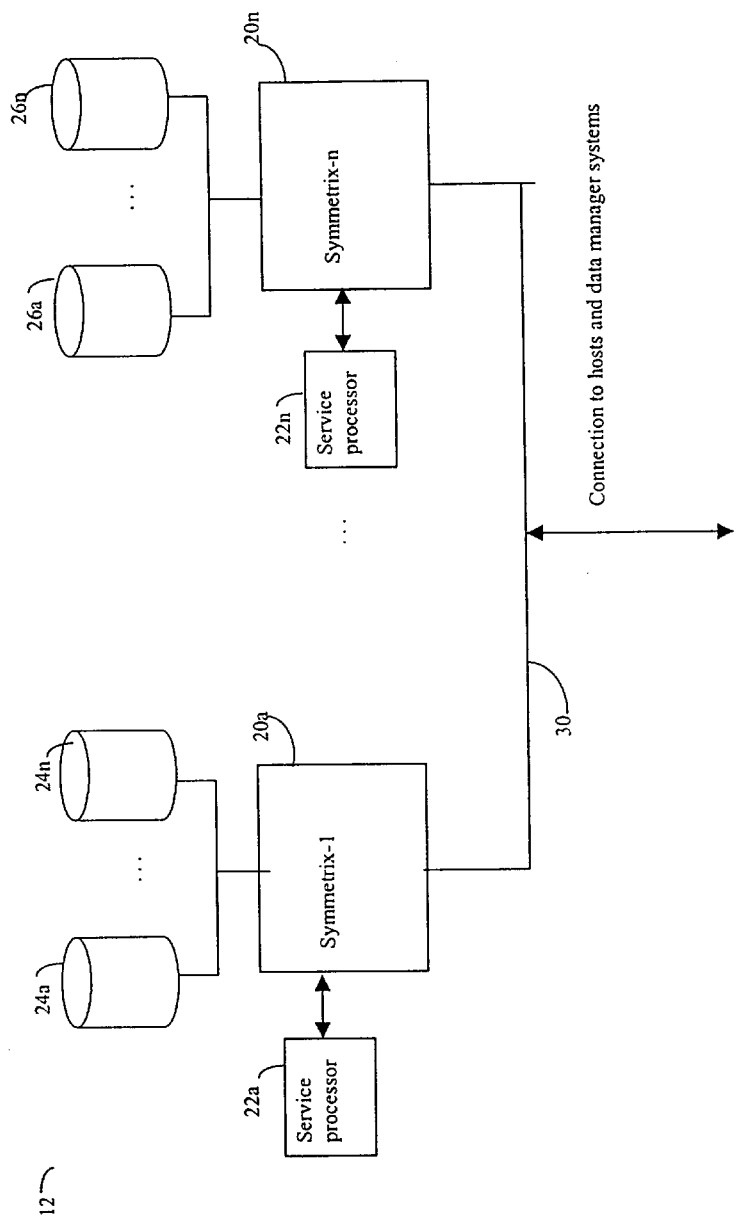
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are N Symmetrix data storage devices 20a–20n as manufactured by EMC Corporation of Hopkinton, Mass. In this particular example, each of the Symmetrix devices 20a–20n may be inter-connected as well as to the host and data manager systems through a communication connection 30. The type of communication connection 30 may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12.

Each of the Symmetrix, such as 20a, is coupled to a service processor 22a and one or more data storage devices 24a–24n. It should be noted in this particular embodiment that connected to each of the Symmetrix may be one or more disks, or other devices in accordance with the data storage requirements of the computer system 10. Other types of data storage devices may be included in an embodiment. The particular data storage device, such as a Symmetrix by EMC Corporation or a disk, should not be construed as a limitation. Other types of commercially available data storage devices, as well as processors and hardware controlling access to these particular devices, may be also be included in an embodiment. The devices included in the data storage system 12 of FIG. 2 are resources that may be available for use and provide storage services to each of the host computer systems and data manager system included in the computer system 10.

In this particular example, each of the Symmetrix devices 20a–20n is associated with a particular service processor, respectively 22a–22n. In this example, the service processor may collect performance data, for example, regarding the I/O performance in connection with the associated Symmetrix. This performance data may relate to, for example, performance measurements of an I/O request as may be made from the different host computer systems 14a–14n.

Figure 3A:
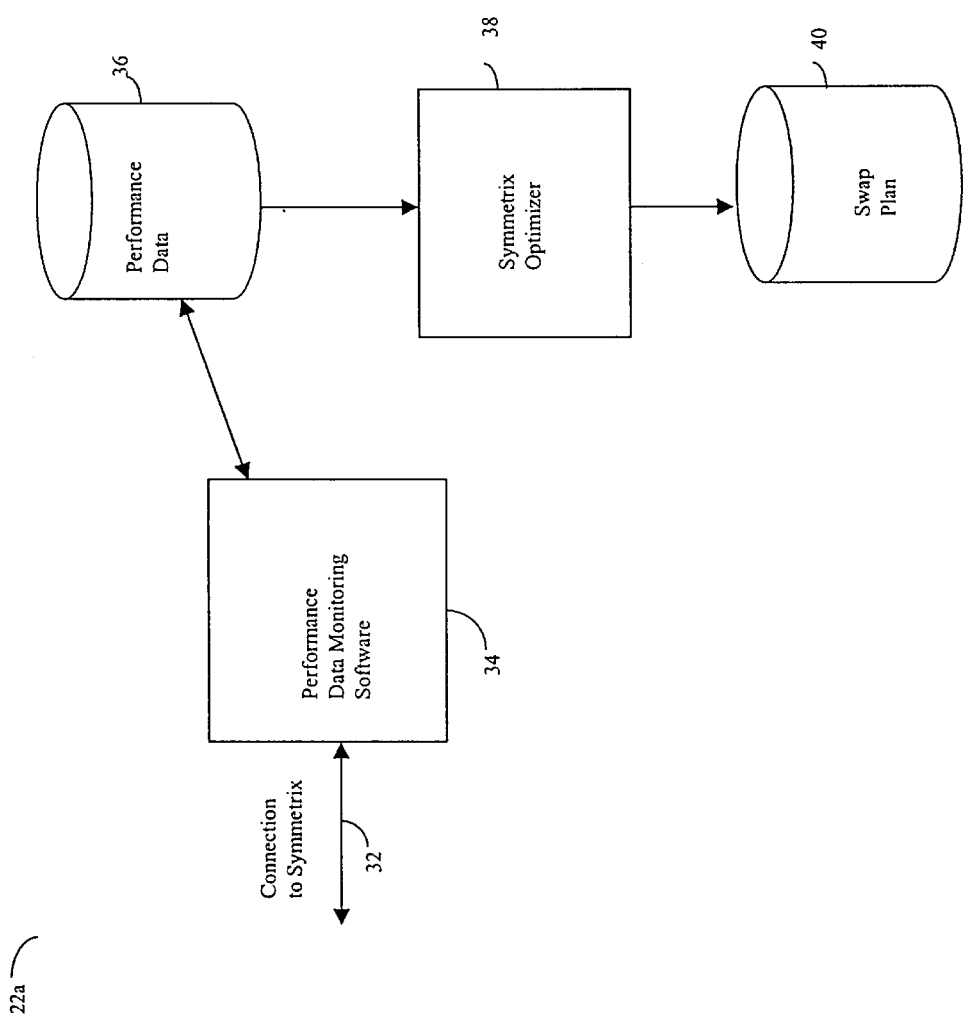
FIG. 3A is an example of an embodiment of software that may be included in a service processor of a data storage system.

Referring now to FIG. 3A, shown is an example of software that may be included in a service processor such as 22a. It should be noted that the service processor may be any one of a variety of commercially available processors, such as an Intel-based processor, and the like. Although what is described herein with reference to FIG. 3A shows details of software that may reside in a particular service processor 22a, similar software components may exist in each of the other service processors such as 22n associated with other Symmetrix data storage devices.

Included in the service processor 22a is performance data monitoring software 34 which gathers performance data about the Symmetrix data storage device 20a through the connection 32. The performance data monitoring software 34 gathers and stores performance data in the performance data file 36. This performance data 36 may serve as an input to the Symmetrix optimizer 38 which attempts to increase the performance of I/O operations, such as those I/O operations associated with data storage devices 24a–24n and Symmetrix 20a. The Symmetrix optimizer 38 may take into consideration various types of parameters and performance data 36 in an attempt to optimize particular metrics associated with performance of the Symmetrix device 20a. These may include, for example, response time, service time, seek time, and the like. For example, the Symmetrix optimizer 38 may attempt to decrease the response time associated with I/O requests. It may use the performance data 36 to produce as an output swap plan 40. The swap plan 40 may include, for example, a description of which logical volumes on a particular data storage device such as 24a may be swap candidates.

The performance data 36 gathered may include data regarding particular performance characteristics, for example, gathered by hardware and/or software modules monitoring particular device components. As described in more detail elsewhere herein, device components of a Symmetrix device may include, for example, a cache, a disk director, a disk bus, other internal buses, and the like. Data relating to performance characteristics for each of these components may be gathered and used in connection with determining other performance data and metrics as may be included in a particular embodiment.

Each of the data storage devices 24a–24n may be physical devices, such as disks, and may be organized and segmented into one or more logical volumes (LVs). Particular I/O requests may be associated with particular LVs. In accordance with the performance data 36, the Symmetrix Optimizer 38 may output a Swap Plan 40 using different heuristics in an attempt to increase the performance of a Symmetrix 20a. An example of a load balancing technique that may be included an embodiment of the optimizer 38 is described in issued U.S. Pat. No. 6,061,761, entitled "Method for Exchanging Logical Volumes in a Disk Array Storage Device in Response to Statistical Analysis and Preliminary Testing", to Bachmat assigned to EMC Corporation of Hopkinton, Mass., which is herein incorporated by reference. Another example of a technique that may be included in an embodiment of the optimizer 38 in connection with load balancing is described in issued U.S. Pat. No. 6,088,766, entitled "Method for Exchanging Data Blocks on Disk Storage Devices Utilizing Disk Access Statistics and Testing for the Effect of a Change", to Bachmat et al., assigned to EMC Corporation of Hopkinton, Mass. which is also herein incorporated by reference.

In one embodiment, the Symmetrix optimizer 38 may output a swap plan 40 to be implemented within the Symmetrix device 20a. Generally, the swap plan 40 may be implemented for example, by swapping the data between LVs on one or more physical devices. This swapping operation may be performed, for example, as a background task by scheduling the swapping as a background operation with a lower priority than that associated with I/O requests as may be issued from the one or more host computer systems in the computer system 10.

In one embodiment, the Symmetrix optimizer 38 may output a swap plan 40 using any one a variety of different evaluation techniques. One technique evaluates the physical disk activity taking into account particular data operations. For example, cache hits may be ignored. Other data operations, such as a read operation when there is a cache miss, or a data write operation, may be monitored in connection with evaluating physical disk activity. Using data gathered in connection with particular types of data operations related to physical disk activity, the swap plan 40 may be produced by the optimizer 38.

Figure 3B:
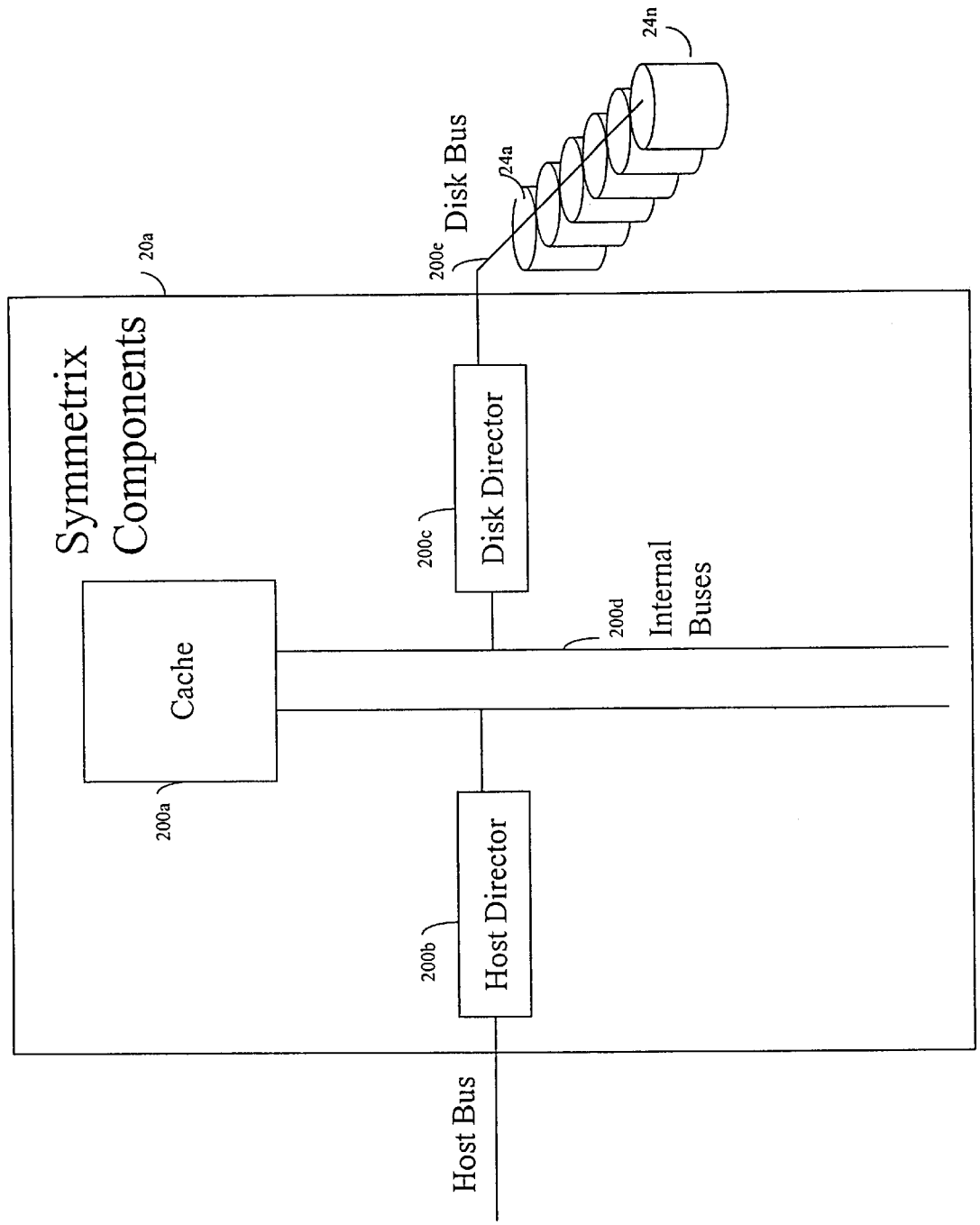
FIG. 3B is an example of an embodiment of components that may be included and used in connection with a Symmetrix device.

Referring now to FIG. 3B, shown is an example of an embodiment of components that may be included within, and used in connection with, a Symmetrix device. Components included, for example, in the embodiment of FIG. 3B of device 20a may include a cache 200a, a disk director 200c, one or more internal buses 200d, disk bus 200e and a host director 200b. The cache 200a may be used for caching portions of data from the disks 24a–24e in accordance with any one of a variety of caching techniques as known to those of ordinary skill in the art. The one or more internal buses 200d may be used for Symmetrix internal communications. The host director 200b may include hardware and/or software used in communicating with one or more host systems through a host bus. The disk director 200c may include hardware and/or software used in connection with communicating to the disks 24a–24n over disk bus 200e. Data may be gathered in connection with each of these components of the device 20a. Additionally, this data may be used in producing other data and metrics in accordance with, for example, the performance of each Symmetrix component, groups of more than one Symmetrix component, a particular defined path or route between Symmetrix components, the performance of the Symmetrix device as a whole and other elements of the system 10 of FIG. 1, and the like.

It should be noted that one embodiment of the Optimizer 38 previously described in connection with 22a of FIG. 3A may determine a swap plan, for example, in accordance with data gathered in connection with activity of disk devices 24a–24n. Data gathered, for example, in connection with disk bus activity, host bus activity and the like may not be included in determining a swap plan. However, as will be described in more detail elsewhere herein, the swapping of data associated with two LVs may affect metrics or measurements representing aggregate performance data as well as other data gathered in connection with other components, such as the disk bus 200e.

Figure 4:
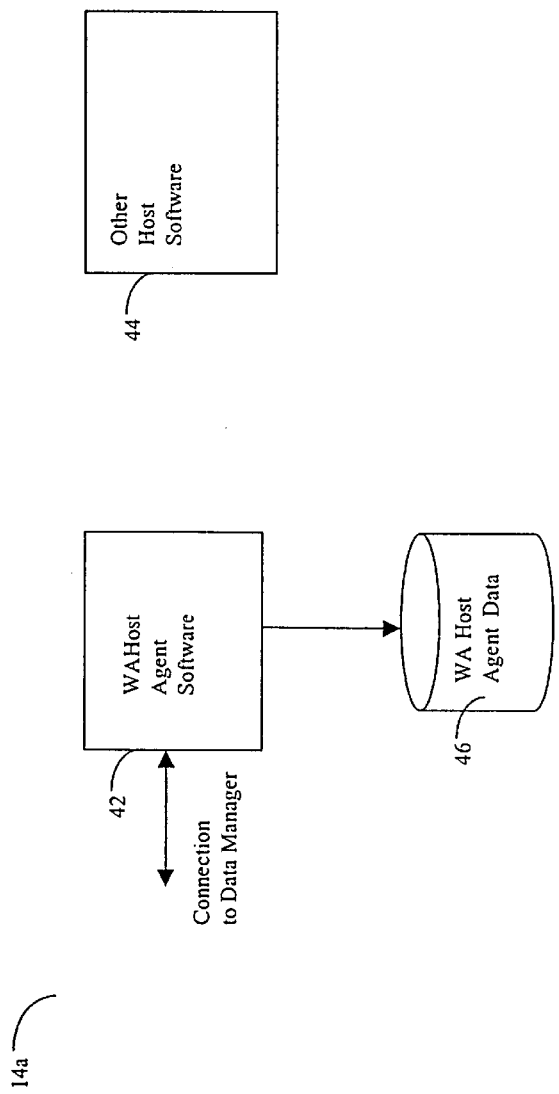
FIG. 4 is an example of an embodiment of software that may be included in a host system.

Referring now to FIG. 4, shown is an example of an embodiment of software that may be included in one of the host computer systems such as 14a. Although what will be described is particular to a host computer system 14a, similar software components may reside on other host computer systems included in the computer system 10 of FIG. 1. Software that may be included in the host computer system 14a may include Work Analyzer (WA) host agent software 42. Generally, WA host agent software 42 monitors activity of the host 14a. In other words, WA host agent software 42 gathers data associated with different operations as may be performed in connection with the host 14a. This may include, for example, data gathered in connection with I/O requests issued by the host 14a, such as the total number of read commands, total number of write commands and various service and process times associated with these types of I/O operations and requests. WA host agent software 42 may gather these and other data associated with different types of operations in connection with monitoring the activities of the different host that may be included in a computer system 10. As is described in more detail elsewhere herein, the WA host agent software is one component that may be included in a software product for gathering data in accordance with monitoring system performance.

The WA host agent software 42 may store this data gathered in the WA host agent data file 46. In this particular example, the WA host agent data file 46 may be stored on a storage device that is local to the host system 14a. The storage device may be any one of a variety of data storage devices, such as a disk or tape, that may be accessible from the host system 14a. The WA host agent software 42 has a connection to the data manager system 16 also included in the computer system 10 of FIG. 1. In this particular example, the connection with the data manager system 16 may be, for example, through communication medium 18 as previously described in connection with FIG. 1. Also shown as residing on the host computer system 14a is other host software 44. This may include, for example, other operating system and application software that may reside in the host computer system 14a.

It should be noted that the WA host agent software agent 42 may be written in any number of variety of commercially available programming languages such as C and C++ as may be executed on the particular host system 14a.

As will be described in paragraphs that follow, the WA host agent data file may reside on each of the different host computer systems 14a–14n. In this particular example, each of the local host agent data files included in each of the host computer systems 14a–14n may be collected and gathered by data manager system 16. By having agent software located on each of the host systems, the WA host agent software 42 acts as a reporter or gatherer of data in connection with the performance of each of the host computer systems. This information may be reported and gathered to the data manager system 16.

Figure 5:
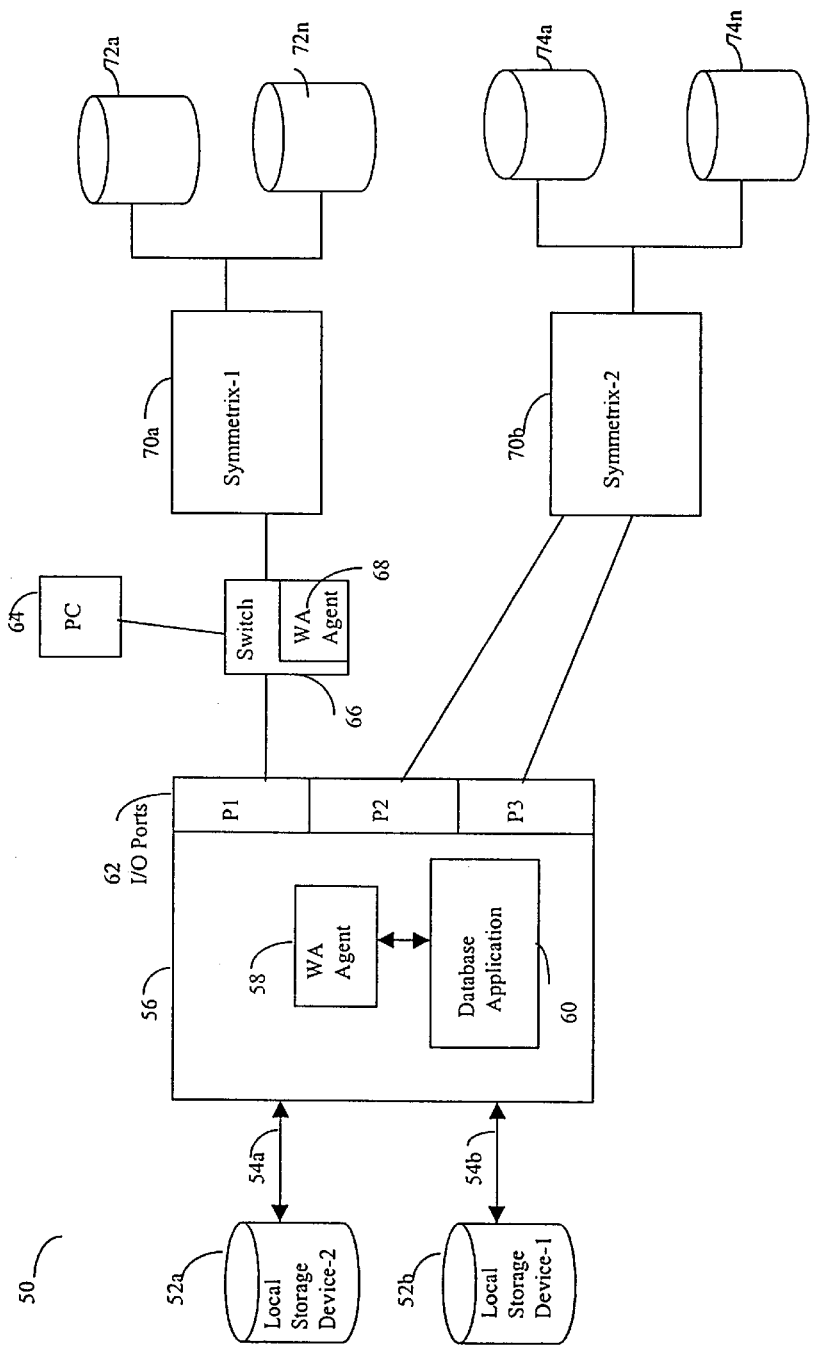
FIG. 5 is an example of an embodiment of another computer system according to the present invention.

Referring now to FIG. 5, shown is an example of another embodiment of a computer system 50 according to the present invention. It should be noted that the computer system 50 is another example of a configuration of a host computer system and data storage devices. A computer system 50 of FIG. 5 includes a host computer system 56 with two local storage devices 52a and 52b. Each of the local storage devices 52a and 52b are, respectfully, connected to the computer system 56 through connections 54a and 54b. The host computer system 56 has access to two Symmetrix data storage devices 70a and 70b. Connected to each of the Symmetrix data storage devices 70a and 70b are N devices, such as disks. For example, connected to Symmetrix device 70a are devices 72a–72n. Similarly, connected to the second Symmetrix device 70b are devices 74a–74n.

The host system 56 may be similar to a host computer system 14a–14n previously described. Similarly, the two Symmetrix devices 70a and 70b may be as previously described in connection with the data storage system 12. Not shown but also included in the computer system 50 are connections from the host system 56 to a data manager system, such as the data manager system 16 as previously described in connection with the computer system 10 of FIG. 1. It should be noted that details such as this may be omitted for the sake of simplicity in illustrating another embodiment of a computer system host connected to a data storage system that may be monitored.

In this particular example, the host computer system 56 is host to a database application 60. Included is WA agent software 58 which gathers data of host activity, for example, in connection with the database application 60. The host system 56 is shown as including three I/O ports 62. In this example, the I/O ports 62 are denoted P1, P2 and P3. The host 56 communicates with the Symmetrix device 70a through I/O port P1 and connects to the Symmetrix device 70b using I/O ports P2 and P3. Additionally, port P1 is coupled to a switch 66. The switch 66 may serve, for example, as a data switching device by which the personal computer (PC) 64 may also access the Symmetrix device 70a. The WA agent software 68 gathers data regarding the performance of the switch 66.

Generally, an instance of the WA agent software may be associated a particular "data provider" for which performance data is to be gathered. In the computer system 50, components such as the switch 66 and the database application 60 may be referred to as "data providers" to be monitored in this example. WA agent software such as the software 58 and 68 may gather data for each provider. In other words, in this particular example, it may be desired to monitor the behavior and performance of the database application 60 and the switch 66. As previously described in connection with the WA agent software, but not shown in the example computer system 50, are WA host agent data files, for example, similar to the WA host agent data file 46 described elsewhere herein. In other words, a data file is produced by WA agent 58 in accordance with the activity of the database application 60. Similarly, a second data file is gathered by WA agent software 68 in accordance with the activities of the Switch 66.

It should be noted that in an embodiment of a computer system, I/O ports associated with a host system may connect to the same or different Symmetrix devices. In this particular example, however, there are dedicated I/O ports associated with particular Symmetrix devices.

Figure 6:
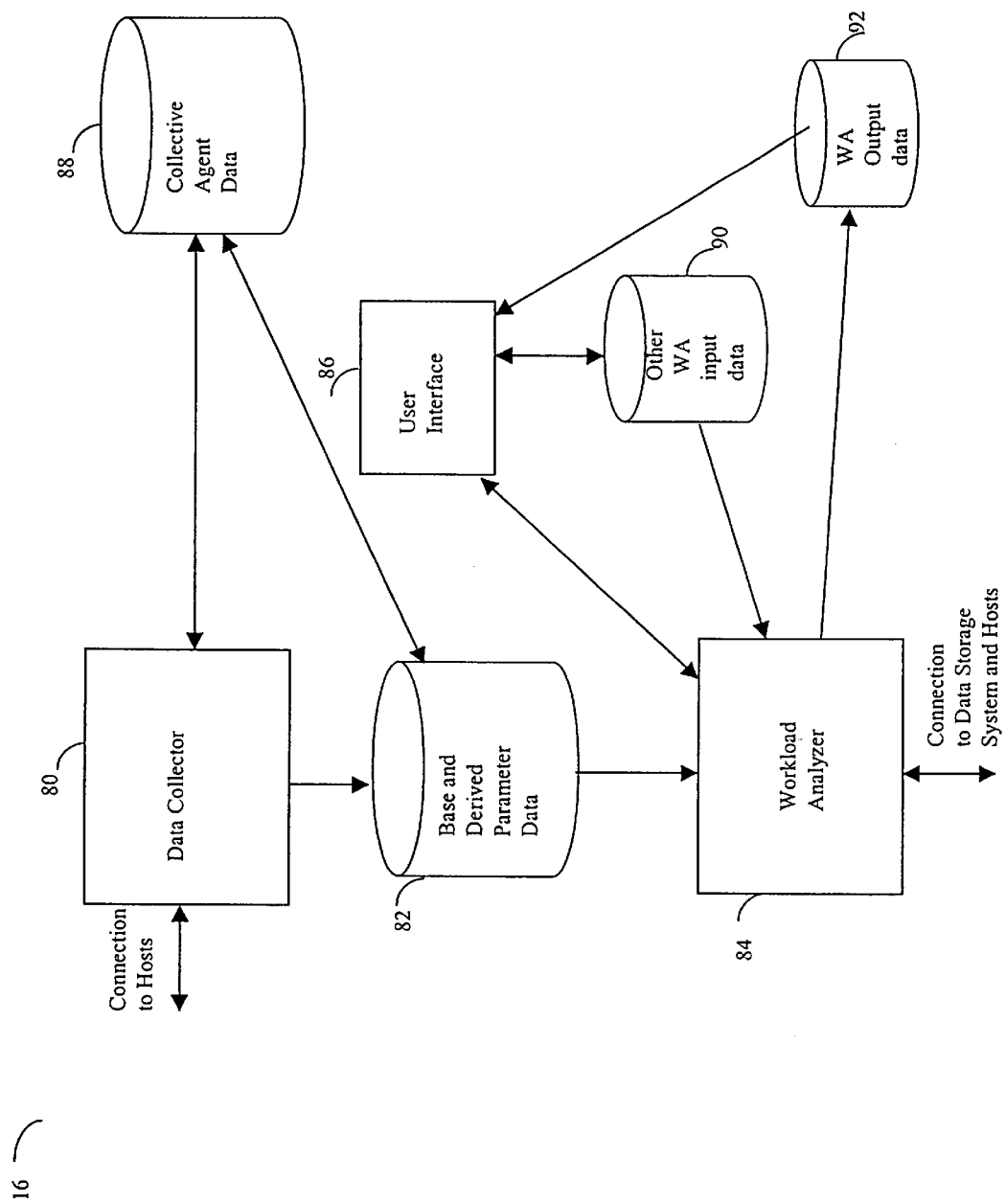
FIG. 6 is an example of an embodiment of software that may be included in the data manager system.

Referring now to FIG. 6, shown is an example of an embodiment of the data manager system 16 as may be included in the computer system 10 of FIG. 1. Software that may be included in the data manager system 16, as well as the data files in a particular embodiment, are shown in FIG. 6. Data collector software 80 serves as a data gatherer or integrator of the one or more WA host agent data files 46 as may be gathered by each of the WA host agent software components 42 on the host computer systems as previously described.

The data collector 80 may gather the data and store it in a collective agent data file 88. In other words, the collective agent data file 88 may represent a history of the information gathered from each of the performance data files residing on each of the host systems. This data may be transmitted to the data collector 80, for example, using communication medium 18.

The collective agent data file 88 may represent performance data stored over a period of time. In other words, the collective agent data file may serve as an archive of performance data for a predetermined period of time. Subsequently, the data collector 80 may extract portions of this archived performance data, for example, and output the base and derived parameter data file 82. It should be noted that the collective agent data file 88 may include raw or base data as gathered by each of the agents included in the host computer systems, for example. Other types of data may be "derived from" the base data, such as using the base data in additional calculations. Forming the derived parameter data from a portion of the base data as may be gathered from the different agents may be a function performed by the data collector 80 in accordance with a portion of the base data. Accordingly, the data collector 80 may output the base and derived parameter data file 82 which may include a portion of the raw or base data as collected by each of the agents in addition to derived parameter data.

The base and derived parameter data file 82 may be input to the workload analyzer (WA) 84. The WA may be described as software that focuses on performance management in accordance with data collected by the different agents on the hosts systems and other data providers. A particular points in time, for example, the data collector 80 may take snapshots of the data and include it in the collective agent data file 88 which may serve as an archive. A portion of this data may be extracted by the data collector 80 for which additional derived parameter data may be included in the base and derived parameter data file 82 in addition to the raw or base data as collected by each of the agents in stored in the collective agents data file. It should be noted also that in addition to the base data, the derived data may also be archived in the collective agent data file. Examples, of the data file formats will be described in more detail in paragraphs that follow in connection with other figures.

The base and derived parameter data file 82 may include performance data collected describing the performance of each LV, one or more disks, each Symmetrix device, and other groups of components of the computer system 10. For example, in one embodiment, the following performance data may be collected: I/O rate, I/O size (such as the number of bytes on average in an I/O request), number of Read and Write operations, cache hit rates as a percentage of time data is found in the cache as opposed to a number of times needed to go to disks to retrieve data), physical location of an LV, and the like.

Also included in the data management system is user interface software 86. The user interface software 86, for example, may be used to display the base and derived parameter data.

Also included in the data management system is user interface software 86. The user interface software 86 may be used to accept inputs from, and display outputs to, a user. For example, the user interface software 86 may be used to display the base and derived parameter data 82, and accept other input data 90 to the WA 84. The other input data 90 may include, for example, user input decisions that may be entered interactively using a form or dialogue box, and data input to the WA from a file on a storage device. As described in more detail elsewhere herein, the other WA input data may include alternative or proposed system changes that may be used in connection with the WA 84 to evaluate alternatives in accordance with system performance estimations.

In one embodiment, the WA may be used to estimate performance analysis of one or more devices, such as the Symmetrix, in accordance with current system performance data, as may be input from the base and derived parameter data file 82, and proposed changes, as may be input through user interface 86 or other WA input data 90. The WA may include a modeling technique used to estimate performance. This estimated performance may be quantified as parameters included in the WA output data file 92 which may also be viewed through the user interface 86.

One example of an embodiment of the WA and associated components described herein is set forth in pending U.S. patent application Ser. No. 09/641,224 filed on Aug. 17, 2000, entitled "Method for Storage and Manipulation of Storage System Metrics", which is herein incorporated by reference, and pending U.S. patent application Ser. No. 09/641,227 filed on Aug. 17, 2000, entitled "Method and Apparatus for Storage System Metrics Management and Archive", which also incorporated herein by reference.

Performance data may be archived for a large period of time. This data may be stored in the collective agent file 88 of the data manager system 16. A portion of this archived data may be used as an input to the data collector. Thus, the base or derived parameter data file 82 may be a "snapshot" of the archived data for a time period that may be specified through the user interface 86. For example, the user may select through user interface 86 a portion of one or more LVs associated with different Symmetrix devices included in the data storage system 12. Performance data, as may be included in the base and derived parameter data file 82, collected for these particular storage devices for a predetermined period of time may be viewed through the user interface 86.

Subsequently, after viewing the performance data, suggested modifications to the current configuration, such as swapping two LVs, may be input to the WA 84 as through the other WA input data 90. These suggested modifications may come from a variety of different sources including, for example, user suggestions after viewing the current performance data, and suggested modifications made in accordance with heuristics included in Symmetrix optimizer 38. In accordance with the suggested modifications, the WA 84 may estimate performance parameters, such as the average service or response time, allowing a user, for example, to view estimated performance changes in light of the suggested modifications prior to actually implementing the modifications. In one embodiment, the WA 84 may also allow the user to accept or reject implementation of a proposed modification.

In connection with providing the estimated performance parameters, the WA 84, as described in more detail in paragraphs that follow, may also include a modeling technique by which the WA 84 estimates system performance of particular devices in light of suggested modifications and past performance data. The modeling technique estimates future performance in light of past performance.

Use of this modeling technique may provide desirable benefits. As described, a user may view estimated performance prior to spending the time and resources to implement suggested modifications. The user may also have the option of accepting or rejecting a suggested modification, for example, if this estimated performance does not meet expectations, such as increase one or more performance parameters by a specific amount.

In one example, the WA 84 may estimate performance parameters, such as estimated I/O response time, in accordance with an input proposal to swap one or more LVs associated with one or more Symmetrix devices. A modeling technique included in one embodiment is described in more detail elsewhere herein. Upon acceptance of a proposed plan, data regarding which LVs to be swapped may be transmitted to the appropriate devices included in the data storage system 12 for implementation. Subsequent to implementation, actual performance data may be gathered and again viewed in connection with the WA 84 and the user interface 86.

One type of input data that the WA 84 may model is a proposed swap plan. As known to those skilled in the art, data storage devices such as disks may be organized into one or more logical volumes (LVs). An optimizer as may be included in each of the Symmetrix data storage devices, for example, may attempt to improve performance using performance data monitoring software 34 as previously described herein. An optimizer, such as the Symmetrix optimizer 38, may produce as an output a swap plan, such as swap plan 40, that may be implemented within the data storage system.

In one embodiment, the swap plan 40 previously described in connection with FIG. 3A may serve as WA input data 90 to the WA prior to implementation. In other words, rather than have the optimizer 38 just implement the swap plan 40, the swap plan 40 may serve as an input to the WA 84 as a suggested or proposed modification for which the WA 84 uses its modeling technique to approximate future performance by estimating performance parameters, such as response time.

It should be noted as described in the forgoing arrangement, the Symmetrix optimizer 38 may output a swap plan 40 which may be input to the WA 84, for example, using communication medium 18. Additionally, it should also be noted that a portion of the Symmetrix optimizer as may be responsible for outputting the swap plan may also be included in the WA itself 84 rather than have the optimizer 38 produce the swap plan 40. In other words, a portion of the software included in the Symmetrix optimizer may either be duplicated or transferred to the WA 84 for use with the modeling technique.

Figure 7:
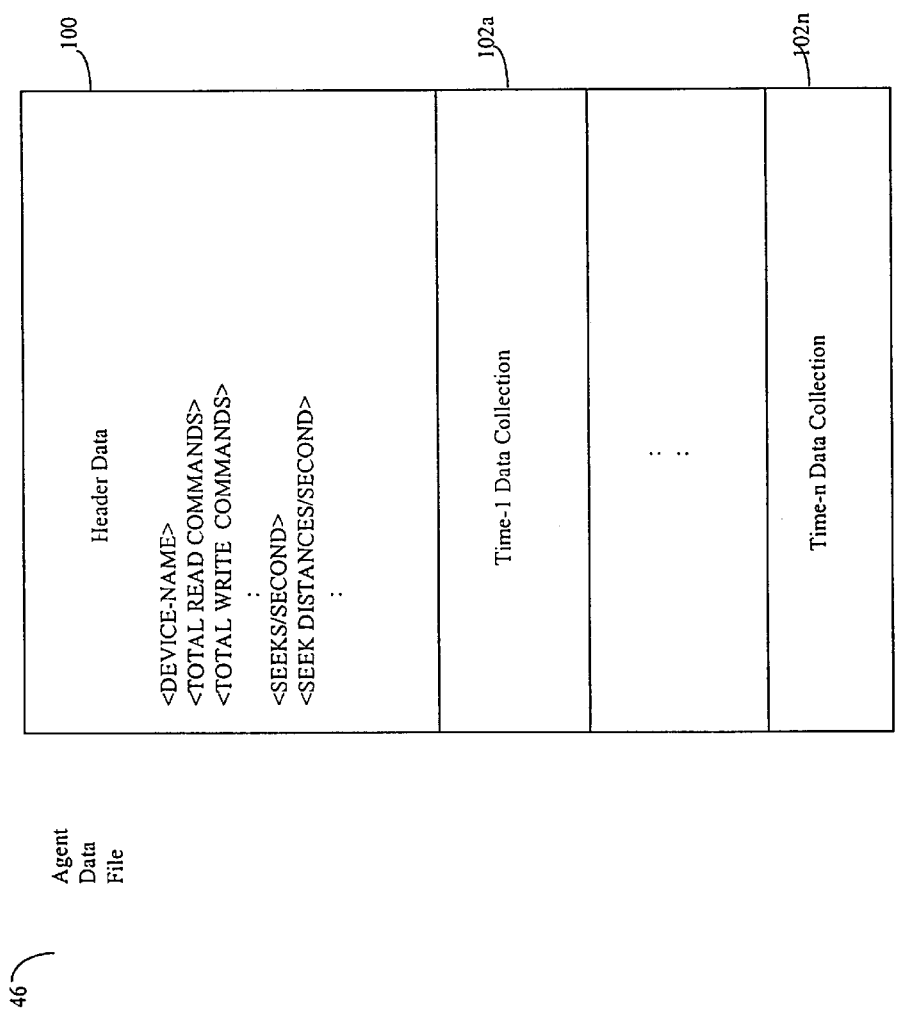
FIG. 7 is an example of an embodiment of an agent data file.

Referring now to FIG. 7, shown is a representation of one embodiment of the agent data file 46. The representation of the data file 46 is an example of agent data file as may be included on each particular host system, or associated with each data provider. The data included in the agent data file 46, as previously described, may be gathered by the WA host agent software 42.

Included in this embodiment of the agent data file 46 is header data 100 and N data collection sets 120a–120n each associated with a particular time interval. The header data 100 may include information describing each of the data collections such 102a–102n. The header data 100, for example, may indicate alpha-numeric descriptions corresponding to the different parameters that may be included in a following collection of data 102a–102n. The data included in each collection may be segregated in that base data may be separated from derived data. In this particular example, base data may appear in each of the data collections followed by derived data. As described elsewhere herein, base data may include parameters gathered directly by an agent, for example. Derived data may be produced from base data, such as calculations involving one or more of base parameters and/or other derived data.

Shown in the header data field 100 is an example of the description that may be included in an embodiment. Header data may include "<DEVICE-NAME>", "<TOTAL-READ COMMANDS>", "<TOTAL-WRITE COMMANDS>", as well as other data descriptions such as <"SEEKS/ SECOND>", and "<SEEK DISTANCES/SECOND>". The contents of field 100 provides a textual description for each of the numeric and/or alpha-numeric components included in each of the data collections 102a–102n.

It should be noted that the type and the particular data collected in the agent data file may vary in accordance with each particular embodiment as well as the different types of parameters being monitored for a given system. In this example, the data such as collected and stored in the agent data file 46 may be used by the WA 84 in calculating service time, for example. The WA may use both the base and derived data as may be included in each of the data collections in the calculation of service time.

Figure 8:
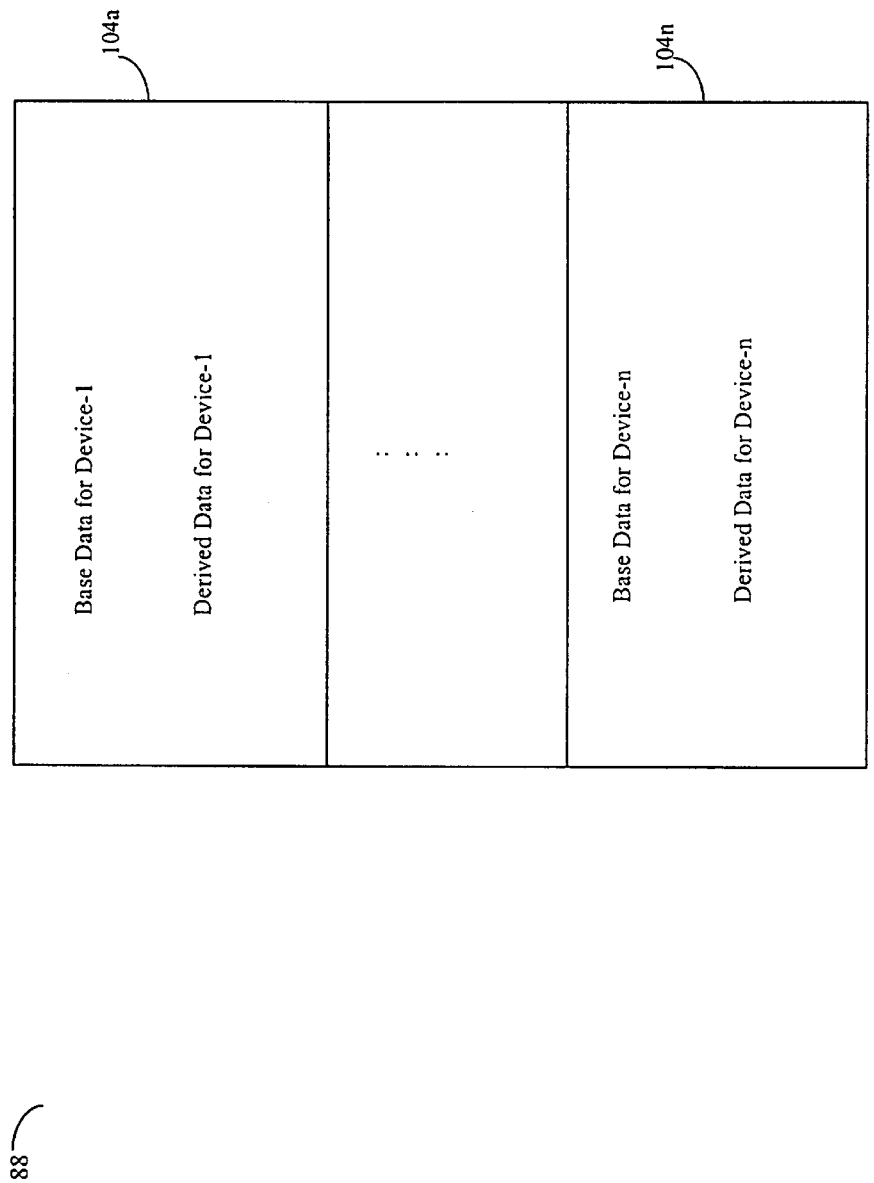
FIG. 8 is an example of an embodiment of collective agent data file as may be included in the data manager system.

Referring now to FIG. 8, shown is an example of a representation of the collective data file 88 as may be stored in the data manager system 16. Generally, the file 88 is a collective representation of the different agent data files. In this particular example, the data may be archived in accordance with data of each device collected over a period of time. In other words, in this example, a collective data file may represent a concatenation of all of the data that is collected over a period of time for each particular device. It should be noted that other organizations of data may be included in an embodiment.

Figure 9:
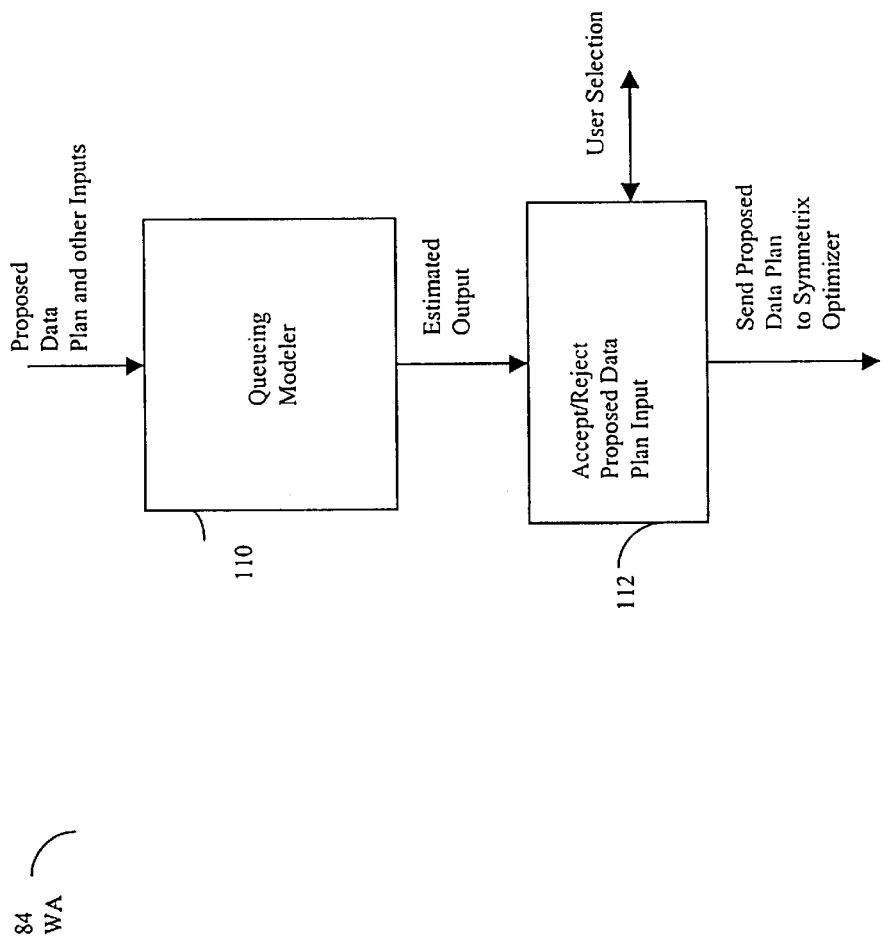
FIG. 9 is an example of an embodiment of the work load analyzer.

Referring now to FIG. 9, shown is an example of different components that may be included in the WA 44. Generally, the WA 84 may be focused on performance management using data collected from the various agents as associated with data providers which, in this particular example, may include host systems and other types of components such as the switch previously described in connection with embodiment 50. The components shown in FIG. 9, including inputs and outputs, may be only a portion of those included in an embodiment of the WA 84 since those included in this description may be used in connection with evaluating alternative or proposed modifications, such as a swap plan 40.

Inputs to the WA 84 in this example may include a swap plan, as may be produced by the optimizer, and actual collected performance data. Using the collected performance data as may be included in an archived data file, for example, the WA may be able to accurately predict or estimate the length of time for completion of an I/O operation in accordance a particular swap plan. In other words, using the historical data as collected by the various agents and associated with a plurality of Symmetrix devices, the WA may be able to estimate and accurately predict for a given swap plan various performance parameters, such as an estimate of the service and response time.

The WA 84 may include a queuing modeler 110 which takes as an input the proposed data plan, such as the swap plan. The queuing modeler 110 may produce estimated parameter values using a modeling technique for example, such as mean value analysis (MVA) or the DCMP queuing network theory. Techniques such as the foregoing are known to those skilled in the art, as described for example in the book entitled "Probability, Statistics, and Queueing Theory with Computer Science Applications" (Second Edition), by Arnold O. Allen, Academic Press. The WA, in particular the queuing modeler, is able to produce an accurate model of a particular data storage configuration in accordance with the swap plan. As an output, the queuing modeler 110 may estimate certain parameters such as service time (ST) or response time (RT) described in more detail elsewhere herein, for example, using any one of a variety of techniques. This estimated output may be displayed for example, through the user interface previously described.

Additionally, a component 112 may be included providing for actions taken in accordance with acceptance or rejection of the proposed data plan input, for example, as a decision made by a user through the user interface. If the proposed data plan, such as the swap. plan, is accepted, the proposed data plan may be sent to the data storage system 12 for implementation by the appropriate devices included therein. In other words using the foregoing arrangement, a user may preview estimated performance in accordance with a modeling technique for a particular swap plan in light of past performance data gathered for data storage devices. This particular type of system may be characterized as an "intelligent" storage system which monitors itself by gathering data and further provides for user input as to whether a proposed data plan, such as a proposed swap plan should be implemented. This decision as to whether to accept or reject a particular proposed swap plan for example, may be done in accordance with data analysis performed by WA components and displaying estimated analysis data to a user.

It should also be noted that in existing storage systems, the optimizer, swap plan and other data formats as well as the optimization activities may be hidden from the outside users. In other words, the optimizer may be viewed as a black box which performs an optimization. Information in connection with the optimizations for tuning may not generally be visible and known to a user. Further, in most existing systems, a user may not view the proposals or suggestions, such as those in connection with a swap plan, as made by an optimizer.

Included in the foregoing is a modeling technique allowing a user to view a "what-if" scenario, for example, as may be proposed in accordance with a swap plan as calculated by the optimizer using heuristics existing therein. Rather than actually just implement a swap plan, the user may be allowed to effect whether such a proposed plan is rejected, or, accepted and actually implemented. This may be useful, for example, because a particular swap plan may not produce acceptable estimated performance gains A user may deem that the costs associated with implementing a particular swap plan may not be worth the performance increase, or decrease, when estimated results are examined. Thus, rather than actually implement the proposed plan to see a performance difference, the modeling technique may serve as a shortcut for estimating whether or not such a proposed plan may be acceptable in accordance with user selection. It should be noted that this decision may also be made in an automated fashion, such as using software which may perform acceptance in accordance with predetermined criteria.

It should also be noted that as an input to the queuing modeler, a proposed swap plan does not need to be produced by the optimizer. In other words, other forms of proposed data plans may be input to the queuing modeler. An alternative swap plan may be derived from other data besides executing an optimizer. For example, a user may produce a simple swap plan where two LVs may be proposed as being swapped. The user, for example, may determine which LVs should be swapped by examining activity of the different LVs through the user interface of the WA. Thus, a sophisticated optimizer heuristic technique may not be needed to determine a highly active and a highly inactive LV candidate for swapping. Such a proposed swap plan may be input to the queuing modeler and the user may decide to accept or reject such a swap. If the swap is accepted, for example, in accordance with a proposed swap plan as may be output by an optimizer or through other forms of user input, the system performance may again be viewed with the user interface tools subsequent to implementing the proposed swap and gathering actual performance data. In this embodiment, the queuing modeler 110 may implement a technique that is quick to execute and produce results. In other words, in comparison to implementing an actual swap plan, the queuing modeler is quickly able to provide an accurate estimate of what performance would be like should a particular swap plan be implemented. This may be preferable to actually implementing the plan which may take a long period of time such as days and even weeks, since the operations associated with swapping LVs may be performed as a background task.

Generally, the response time (RT) as may be determined as known to those skilled in the art in accordance with Little's law and other queuing modeling techniques, may be represented by the formula indicated below:

$$RT \text{ (Response Time)} = ST \text{ (Service Time)}/(1 - \text{the mean utilization})$$

As indicated above, ST is the service time or the amount of time it takes to process a request once it has been received by the system. In this example, the service time is the amount of time it takes to process an I/O request, for example, once it is received by a Symmetrix device. Different base and derived parameter values may be used to calculate ST, such as the I/O rate, the speed of a particular device, the seek distance and the like as may be collected from the data files by the agent for particular devices. Using a particular queuing modeling technique, a proposed swap plan, and the data archive for the performance of particular devices, the RT may be estimated for making the proposed change prior to actually implementing the proposed swap plan.

It should be noted that in one embodiment, the queueing modeler may be used to estimate and model RT. RT in one embodiment may include time in connection with Symmetrix components from when a host initiates an I/O request to the ending point when the request is completed. Referring back to FIG. 3B, for example, the queueing modeler 110 models the performance of the host director, the cache, disk director, internal buses, disk buses, physical disks and the like. The performance of each of these components, for example, may be associated with estimating the RT. A swap plan may be determined in accordance with activity associated with only the disks. In this example, the disk activity is one portion of the aggregate performance data used in estimating the RT as may be modeled by an embodiment of the queueing modeler 110. In other words, the queueing modeler may be used to estimate an aggregate performance metric, such as RT associated with an I/O request, in accordance with another performance metric, such as disk activity. The other performance metric, such as in this instance, may be a component of or used in connection with, determining the aggregate performance metric. Use of the queueing modeler may provide a user with a "view" as to how a change in one portion of a system may affect the performance of another portion of the system. In this instance, the modeler may be used to estimate how swapping LVs may affect an aggregate performance metric such as RT, for example.

A queuing modeler may be included in the WA to estimate other parameters that may be associated with a storage or other system. In this particular example, the storage device statistics are predictive in that past performance may generally be a good indicator of future performance for a given time period. Thus using a modeling technique to predict future performance in accordance with data gathered on past performance and a proposed plan, the modeling technique may generate an accurate estimate of the different parameters and performance statistics associated with a proposed swap plan. The foregoing techniques may be generalized to model other characteristics such as load balancing, cache and bus activity in accordance with data gathered for the data storage devices.

It should be noted that in this particular example, an I/O request may be performed in connection with a cache miss. In other words, an I/O request may not be generated unless a particular data item being retrieved is not stored within a cache. If the data item is stored within a cache, the data value from the cache may be returned to the requestor.

Data storage devices may be characterized as predictive in that they are good candidates for modeling such that future performance may be predicted in accordance with past results for a given time period. Thus, using the techniques described, different types of input may be used to estimate different system parameters for example as may be associated with a data storage system. In one embodiment, the swap plan may be produced for example automatically by an optimizer using heuristics included therein. In another embodiment, a proposed swap plan may simply be derived from a user viewing data, for example, as viewing performance data gathered by the WA. As the complexity of systems and devices increases, such as the number of hardware characteristics increases, a user may choose to let the optimizer or other automated technique produce a proposed swap plan or other type of scenario to be tested and estimated using the queuing modeler. The foregoing modeling technique may be used to model the system response time, load balancing, or any system parameters or any optimizer parameter. The same technique may be used to allow the user to intervene and optionally accept or reject a proposed input plan or change to the system in accordance with any one of a variety of the system parameters.

The foregoing may be useful for quality of service (QOS) estimations. The user may view data in an estimated fashion prior to actually implementing a proposed or suggested alternative system configuration. This may be desirable, for example, rather than actually implementing the plan to obtain performance data associated with a proposed modification. Additionally, the queuing modeler and the WA 84 are adaptable to varying levels of complexity and different types of input. In other words, for a simple case, a user may simply want to swap LVs on a particular data storage device. As the complexity and characteristics of a system may increase, for example, an automated tool, such as the optimizer may be used to take into account all of the different characteristics and parameters to produce an alternative or a suggested data plan. The user may then be allowed to view estimated system performance prior to actually implementing such a plan.

It should generally be noted that the different software components included and described in connection with the WA may be implemented using any one or more of a variety of commercially available programming languages, such as C and C++. The particular language(s) may vary with each embodiment.

Figure 10:
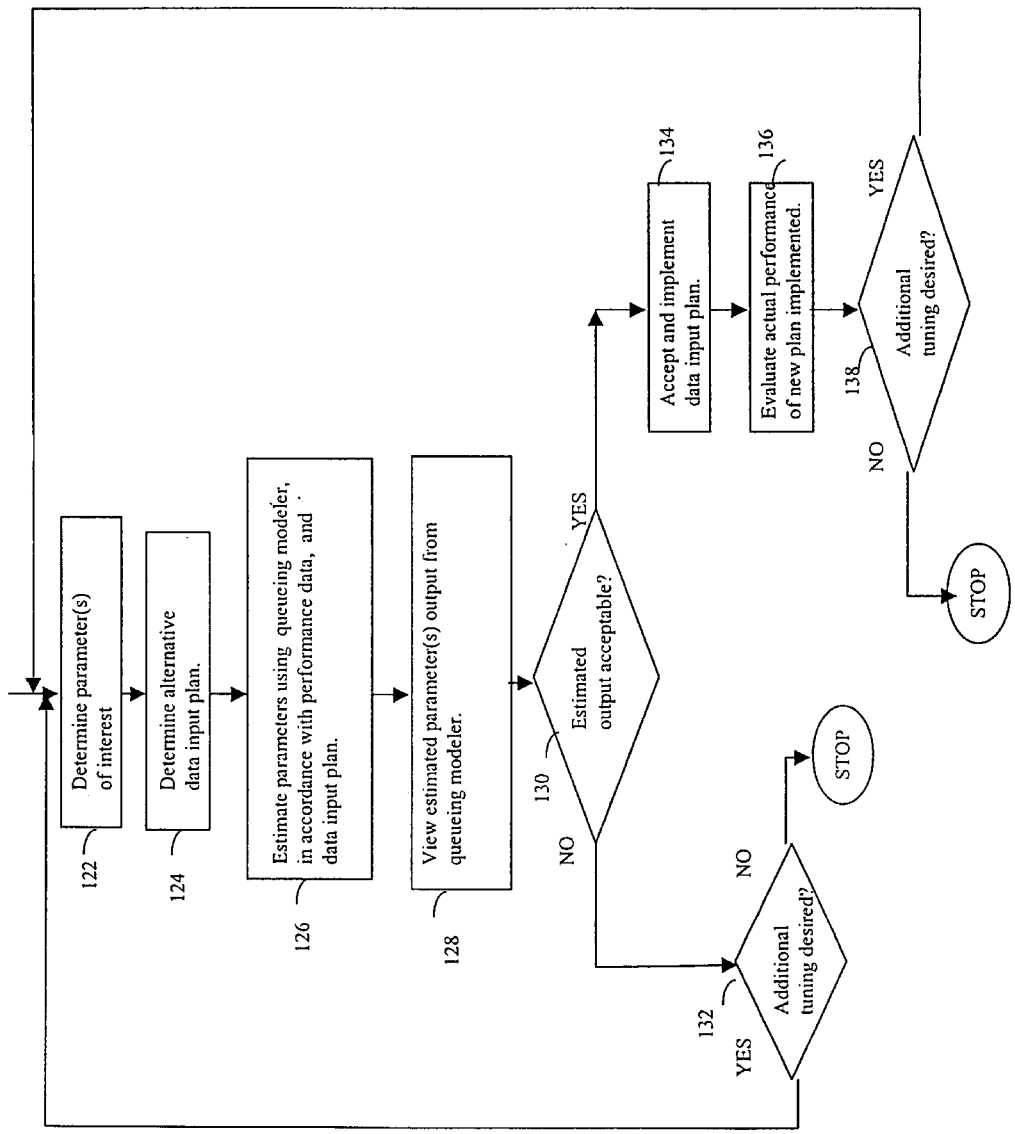
FIG. 10 is a flowchart of steps of one embodiment of a method for evaluating proposed system changes in accordance with a modeling technique.

Referring now to FIG. 10, shown is a flowchart of steps of one embodiment as may be performed using the WA to evaluate alternative data input plans. It should be noted that the steps of flowchart 120 of FIG. 10 are generalized steps that may be used in evaluating a proposed swap plan, such as may be produced by the Symmetrix optimizer, when portions of the optimizer are integrated with the WA in an embodiment for viewing and evaluating results using estimated parameters with the modeling technique. Additionally, the steps of flowchart 120 include generalizations of the foregoing embodiments and descriptions, for example, such that a proposed data input plan is not restricted as being an output or an alternative produced by the optimizer. An alternative data input plan may be obtained, for example, by a user viewing estimated results using a modeling technique such as through the user interface described elsewhere herein. Additionally, the input does not need to be a swap plan. Rather, alternatives may be evaluated in accordance with estimated outputs in accordance with a queuing modeler for any one of a variety of performance parameters and system characteristics. The user may also view these estimated outputs, and accept or reject the implementation of the plan evaluated using the estimated modeling technique.

At step 122, the performance parameter or parameters of interest are determined. These parameters may be determined, for example, by examining a portion of performance data using the WA's user interface. The parameters may be associated with data for a particular time interval as well as associated with particular devices and/or LVs included on each device. At step 124, alternative data input plan is determined. An alternative data input plan may come from using more complex techniques, as in connection with an optimizer such as a suggested swap plan. Alternatively, a data input plan may be derived by a user simply viewing data indicating a highly inactive LV and a highly active LV as swap candidates.

At step 126, the parameters are estimated in accordance with the alternative data input plan, the queuing modeler and the performance data gathered. The past performance data is used with the queuing modeler to predict or estimate system performance with the proposed data input plan.

At step 128, estimated parameters output from the queuing modeler may be viewed, for example, using the WA's user interface. At step 130, a decision is made as to whether the estimated output viewed at step 128 is acceptable. If the estimated output is not acceptable, control proceeds to step 132 where a decision is made as to whether additional tuning is desired. If additional tuning of the system is not desired, the process stops. However, if additional tuning is desired, control proceeds to step 122 where parameters of interest may again be determined.

At step 130, if a decision is made that the estimated output is acceptable, control proceeds to step 134 where the data input plan proposed and estimated using the queuing modeler is actually implemented in the system. At step 136, sometime later subsequent to the implementation of the proposed data input plan, the actual performance of the data input plan may be evaluated, for example, using the WA and viewing actual performance data via the WA's user interface. System performance may be evaluated subsequent to data being gathered for a period of time after implementation a new plan. At step 138, a decision is made as to whether additional tuning is desired. If a decision is made that additional tuning is not desired, processing stops. If, however, additional tuning is desired, control may proceed to step 122 where additional parameters of interest may be determined and alternative data input plans modeled and possibly implemented.

Figure 11:
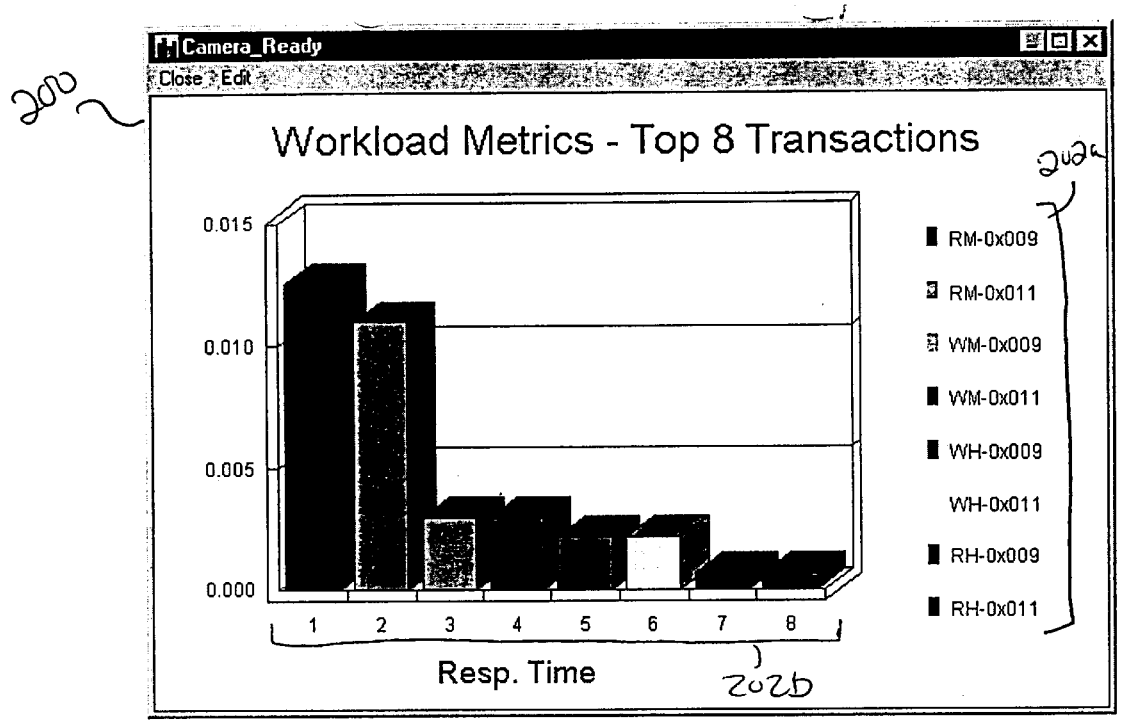
FIG. 11 is an example of an embodiment of a display of a user interface of the workload analyzer.

Referring now to FIG. 11, shown is an example of a screen that may be displayed in connection with an embodiment of the WA. In particular, the screen display 200 may be displayed by an embodiment of the user interface 86. The user interface 86 may include software for displaying results or metrics associated with one or more logical volumes (LVs), disks, and the like. In this example, the display 200 includes a graphical data display of response times associated with 8 logical volumes.

In the example display 200, response times associated with 8 logical volumes identified in 202a are graphically displayed in corresponding bars of a graph at 202b. In this example, the first logical volume of 202a, RM-0x009, corresponds to the bar 1 of 202b, the second logical volume of 202b, RM-0x011, corresponds to the bar 2 of 202b, and so on for the remaining logical volumes of 202a and corresponding bars of graph 202b.

An embodiment may provide for displaying results in accordance with data gathered as described elsewhere herein. The data associated with performance metrics of selected logical volumes may be displayed, as using the graphical display 200, in accordance with a "before snapshot" of logical volume performance prior to performing a logical volume swap. The model as described elsewhere herein may be executed to estimate logical volume performance, such as measured by response time (RT), in an estimated "after snapshot". The "after snapshot" may represent the predicted or estimated logical volume performance, using previously gathered data, if a suggested logical volume swap is performed. The "after snapshot" may be also represented graphically in another screen display similar to the display 200 that may also be associated with a "before snapshot". In other words, the user interface 86 may include software that provide for a graphical or other display of performance data. One embodiment may include an option for displaying the "before snapshot" on one screen display, and the "after snapshot" using a second screen display. Another embodiment may include the option of displaying the "before" and "after" graphical "snapshots" side by side, for example, in a reduced format of a single screen display. In other words, one screen display, such as 200, may include two graphical representations of the before and after snapshots to provide for side-by-side visual comparison by a user. An embodiment may include one or both of the foregoing display options. Different graphical representations may be included in addition to, or as an alternative to, the bar graph display, such as a tabular form or pie graph, and the like. An embodiment may provide for including more than two graphical display results in a single screen display. As known to those skilled in the art, other display options may be included in an embodiment in accordance with details that may vary with each particular implementation.

The queueing modeler may be used to estimate RT and graphically display a "before" snapshot with regard to an LV swap. Subsequently, the queueing modeler may be used to estimate RT with regard to hypothetically performing the LV swap (the "after" snapshot). In this particular example, the modeler may be used to view the net effect of an LV swap, such as associated with and determined in accordance with disk activity, upon one or more aggregate performance metrics, such as RT. Accordingly, a swap plan may be accepted or rejected based upon modeling estimates of the RT of an I/O operation. In other words, the queueing modeler may be used to estimate the effect of a modification upon a portion of a system in accordance with one or more performance metrics. Acceptance of the modification may be made in accordance with viewing performance metrics estimated prior to making the modification, and performance metrics estimated in accordance with hypothetically performing the modification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system for evaluating performance of at least one data storage device comprising:
   gathering actual performance data associated with the at least one data storage device;
   determining a modification in accordance with performance of the at least one data storage device;
   modeling estimated performance of the at least one data storage device in connection with said modification and said actual performance data; and
   determining, in response to modeling, whether to implement the modification.

2. The method of claim 1, further comprising:
   viewing a portion of the actual performance data; and
   determining, in response to viewing, said modification.

3. The method of claim 2, further comprising:
   determining whether to implement the modification in accordance with user input.

4. The method of claim 1, further comprising:
   determining the modification in connection with an automated technique included in a software tool.

5. The method of claim 4, further comprising:
   executing a first portion of machine executable code to determine said modification.

6. The method of claim 5, wherein the first portion of machine executable code is included in an optimizer, and said executing of the first portion is performed in a data storage system including said at least one data storage device.

7. The method of claim 6, wherein the portion of actual performance data is viewed via a user interface.

8. The method of claim 6, further comprising:
   specifying at least two portions of data included in said at least one data storage device to be swapped, and wherein said modification is a swap plan specifying said at least two portions of data.

9. The method of claim 8, wherein each of said at least two portions of data are logical volumes of disk data storage.

10. The method of claim 9, wherein said modeling estimated performance further comprises:
    determining estimated service time for a data operation request in connection with said at least one data storage device.

11. The method of claim 10, further comprising:
    determining estimated service time in connection with a cache miss of the at least one data storage device.

12. The method of claim 11, wherein there are at least two data storage devices, and the method further comprising:
    gathering, at each of said at least two data storage devices, a corresponding portion of said actual performance data associated with performance of said each data storage device; and
    collecting at least two corresponding portions of said actual performance data associated with said at least two data storage devices.

13. The method of claim 11, further comprising:
    determining estimated response time for a data operation request in connection with said at least one data storage device.

14. A computer readable medium encoded for evaluating performance of at least one data storage device comprising:
    machine executable code for gathering actual performance data associated with the at least one data storage device;
    machine executable code for determining a modification in accordance with performance of the at least one data storage device;
    machine executable code for modeling estimated performance of the at least one data storage device in connection with said modification and said actual performance data; and
    machine executable code for determining whether to implement the modification.

15. The computer readable medium of claim 14, further comprising:

machine executable code for viewing a portion of the actual performance data; and machine executable code for determining said modification.

16. The computer readable medium of claim 15, further comprising:

machine executable code for determining whether to implement the modification in accordance with user input.

17. The computer readable medium of claim 14, further comprising:

a first portion of machine executable code for determining the modification.

18. The computer readable medium of claim 17, wherein the first portion of machine executable code is included in an optimizer, and the computer system further includes a data storage system that includes said optimizer and said at least one data storage device.

19. The computer readable medium of claim 18, wherein the portion of actual performance data is viewed via a user interface.

20. The computer readable medium of claim 18, further comprising:

machine executable code for specifying at least two portions of data included in said at least one data storage device to be swapped, and wherein said modification is a swap plan specifying said at least two portions of data.

21. The computer readable medium of claim 20, wherein each of said at least two portions of data are logical volumes of disk data storage.

22. The computer readable medium of claim 21, wherein said machine executable code for modeling estimated performance further comprises:

machine executable code for determining estimated service time for a data operation request in connection with said at least one data storage device.

23. The computer readable medium of claim 22, further comprising:

machine executable code for determining estimated service time in connection with a cache miss of the at least one data storage device.

24. The computer readable medium of claim 23, wherein there are at least two data storage devices, and the computer readable medium further comprising:

machine executable code for gathering, at each of said at least two data storage devices, a corresponding portion of said actual performance data associated with performance of said each data storage device; and machine executable code for collecting at least two corresponding portions of said actual performance data associated with said at least two data storage devices.

25. The computer readable medium of claim 23, further comprising:

machine executable code for determining estimated response time for a data operation request in connection with said at least one data storage device.

26. A computer system comprising:

a computer system resource used by at least one host;

a work analyzer for performing performance analysis of the computer system resource in accordance with actual performance data;

a modeler for estimating performance of the computer system resource in accordance with a modification associated with the computer system resource and a portion of the actual performance data; and an evaluator, coupled to the modeler, for determining whether to implement said modification.

27. The computer system of claim 26, further comprising:

a data storage system including at least one data storage device, wherein the computer system resource is the at least one data storage device.

28. The computer system of claim 27, further comprising:

an optimizer producing a swap plan in connection with performance of the at least one data storage device, wherein the swap plan is said modification.

29. The computer system of claim 28, further comprising:

a user interface for viewing the performance analysis;

user input, coupled to the evaluator and the user interface, for determining whether to implement the modification.

30. The computer system of claim 29, wherein said at least one host system is connected to the data storage system, the optimizer is included in the data storage system, the work analyzer, the user interface, the modeler, and the evaluator are included in data manager system.

31. The computer system of claim 30, further comprising:

an agent associated with said computer system resource for gathering actual performance data in connection with said computer system resource.

32. The computer system of claim 31, further comprising:

a data collector for collecting actual performance data produced by the agent.

33. The computer system of claim 32, further comprising:

an archive of actual performance data associated with a predetermined period of time, wherein the portion of actual performance data used by the modeler is included in said archive.

34. The computer system of claim 33, wherein the actual performance data includes base parameters.

35. The computer system of claim 34, wherein the actual performance data includes derived parameters produced using at least one base parameter.

36. A method executed in a computer system for performing performance analysis comprising:

performing data operations in connection with a computer system resource by at least one host system;

performing, by a work analyzer, performance analysis of the computer system resource in accordance with actual performance data;

estimating, by a modeler, performance of the computer system resource in accordance with a modification associated with the computer system resource and a portion of the actual performance data; and determining, by an evaluator, whether to implement said modification.

37. The method of claim 36, wherein the computer system includes a data storage system including at least one data storage device, wherein the computer system resource is the at least one data storage device.

38. The method of claim 37, further comprising:

producing, using an optimizer, a swap plan in connection with performance of the at least one data storage device, wherein the swap plan is said modification.

39. The method of claim 38, further comprising:

viewing the performance analysis with a user interface;

determining, in accordance with user input, whether to implement the modification.

40. The method of claim 39, wherein said at least one host system is connected to the data storage system, the optimizer is included in the data storage system, the work analyzer, the user interface, and the modeler are included in a data manager system.

41. The method of claim 40, further comprising:
gathering actual performance data in connection with said computer system resource by an agent associated with the computer system resource.

42. The method of claim 41, further comprising:
collecting, by a data collector, actual performance data produced by the agent.

43. The method of claim 42, further comprising:
archiving actual performance data associated with a predetermined period of time, wherein the portion of actual performance data used by the modeler is included in said archive.

44. The method of claim 43, wherein the actual performance data includes base parameters.

45. The method of claim 44, wherein the actual performance data includes at least one derived parameter produced using at least one base parameter.

46. A method executed in a computer system for evaluating performance of at least one data storage device comprising:
gathering actual performance data associated with the at least one data storage device;
determining a modification in accordance with performance of the at least one data storage device;
modeling estimated performance of the at least one data storage device in connection with said modification and said actual performance data;
presenting said estimated performance in connection with said modification in a visual form to a user; and
determining, in response to presenting, whether to implement the modification.

47. The method of claim 46, wherein said visual form is one of a tabular form and a graphical form.

48. The method of claim 47, further comprising:
receiving said response using a graphical user interface; and
implementing the modification by an optimizer associated with the at least one data storage device.

49. The method of claim 48, further comprising:
specifying at least two portions of data included in said at least one data storage device to be swapped, and wherein the modification is a swap plan specifying said at least two portions.

50. The method of claim 49, wherein each of said at least two portions of data are logical volumes of disk data storage.

51. The method of claim 46, further comprising:
presenting a visual display in connection with performance of said at least one data storage device without said modification and the actual performance data, and wherein said determining whether to implement said modification is also performed in response to said presenting a visual display in connection with performance of said at least one data storage device without said modification.

52. A computer readable medium encoded for evaluating performance of at least one data storage device comprising:
machine executable code for gathering actual performance data associated with the at least one data storage device;
machine executable code for determining a modification in accordance with performance of the at least one data storage device;
machine executable code for modeling estimated performance of the at least one data storage device in connection with said modification and said actual performance data;
machine executable code for presenting said estimated performance in connection with said modification in a visual form to a user; and
machine executable code for determining whether to implement the modification which executes in response to said machine executable code for presenting said estimated performance.

53. The computer readable medium of claim 52, wherein said visual form is one of a tabular form and a graphical form.

54. The computer readable medium of claim 53, further comprising:
machine executable code for receiving said response using a graphical user interface; and
machine executable code for implementing the modification by an optimizer associated with the at least one data storage device.

55. The computer readable medium of claim 54, further comprising:
machine executable code for specifying at least two portions of data included in said at least one data storage device to be swapped, and wherein the modification is a swap plan specifying said at least two portions.

56. The computer readable medium of claim 55, wherein each of said at least two portions of data are logical volumes of disk data storage.

57. The computer readable medium of claim 52, further comprising:
machine executable code for presenting a visual display in connection with performance of said at least one data storage device without said modification and the actual performance data, and wherein said machine executable code for determining whether to implement said modification is executed in response to said machine executable code for presenting a visual display in connection with performance of said at least one data storage device without said modification.

58. A method executed in a computer system for determining whether to implement a swap plan comprising:
performing data operations in connection with at least one data storage device included in said computer system;
collecting performance data in connection with said data operations;
determining a swap plan in accordance with a first portion of performance data associated with said data operations;
estimating, using a second portion of said performance data, a first response time associated with said at least one data storage device without implementing said swap plan;
estimating, using said second portion of said performance data, a second response time associated with said at least one data storage device with said swap plan; and
determining whether to implement said swap plan in accordance with said first and said second response times.

59. The method of claim 58, wherein said swap plan includes a first logical volume and a second logical volume each associated with a different data storage device, and the method further including:
swapping a first set of data associated with said first logical volume with a second set of data associated with said second logical volume if it is determined to implement said swap plan.

60. The method of claim 58, further comprising:
analyzing said first portion of said performance data using an optimizer; and
determining, in response to analyzing, said swap plan using said optimizer.

61. The method of claim 58, wherein said estimating said first and second response times includes:
modeling using said second portion of performance data associated with a plurality of components associated with said at least one data storage device, and
wherein determining a swap plan includes:
analyzing said first portion of performance data associated with at least one of said plurality of components.

62. The method of claim 61, wherein at least one common performance data metric is included in both said first portion and said second portion of performance data.

63. A computer readable medium encoded for determining whether to implement a swap plan comprising:
machine executable code for performing data operations in connection with at least one data storage device included in said computer system;
machine executable code for collecting performance data in connection with said data operations;
machine executable code for determining a swap plan in accordance with a first portion of performance data associated with said data operations;
machine executable code for estimating, using a second portion of said performance data, a first response time associated with said at least one data storage device without implementing said swap plan;
machine executable code for estimating, using said second portion of said performance data, a second response time associated with said at least one data storage device with said swap plan; and
machine executable code for determining whether to implement said swap plan in accordance with said first and said second response times.

64. The computer readable medium of claim 63, wherein said swap plan includes a first logical volume and a second logical volume each associated with a different data storage device, and the computer readable medium further including:
machine executable code for swapping a first set of data associated with said first logical volume with a second set of data associated with said second logical volume if it is determined to implement said swap plan.

65. The computer readable medium of claim 63, further comprising:
machine executable code for analyzing said first portion of said performance data using an optimizer; and
machine executable code for determining said swap plan using said optimizer.

66. The computer readable medium of claim 63, wherein said machine executable code for estimating said first and second response times includes:
machine executable code for modeling using said second portion of performance data associated with a plurality of components associated with said at least one data storage device, and
wherein said machine executable code for determining a swap plan includes:
machine executable code for analyzing said first portion of performance data associated with at least one of said plurality of components.

67. The computer readable medium of claim 66, wherein at least one common performance data metric is included in both said first portion and said second portion of performance data.

68. A method for evaluating performance of at least one data storage device comprising:
determining a modification in accordance with performance of the at least one data storage device;
modeling estimated performance of the at least one data storage device in connection with said modification and actual performance data associated with said at least one data storage device; and
determining, in response to said modeling, whether to implement the modification.

69. The method of claim 68, further comprising:
performing at least one data operation using said at least one data storage device; and
performing a performance analysis of said at least one data storage device in accordance with said at least one data operation.

70. The method of claim 69, wherein the at least one data storage device is included in a computer system, and the method further comprising:
producing a swap plan in connection with performance of said at least one data storage system wherein the swap plan includes the modification, said swap plan indicating at least two portions of data of said at least one data storage device to be swapped.

71. The method of claim 70, further comprising:
determining the modification using an optimizer.

72. The method of claim 68, further comprising:
gathering performance data about said at least one data storage device.

73. The method of claim 72, further comprising:
storing said performance data, wherein said performance data includes at least one base parameter and at least one derived parameter produced using said at least one base parameter.

74. The method of claim 68, further comprising:
displaying one of a graphical representation and a tabular representation of said estimated performance;
receiving a user input in response to said display; and
determining whether to implement said modification in response to said user input.

75. A computer readable medium encoded for evaluating performance of at least one data storage device comprising:
machine executable instructions that determine a modification in accordance with performance of the at least one data storage device;
machine executable instructions that model estimated performance of the at least one data storage device in connection with said modification and actual performance data associated with said at least one data storage device; and
machine executable instructions that determine whether to implement the modification.

76. The computer readable medium of claim 75, further comprising:
machine executable instructions that perform at least one data operation using said at least one data storage device; and
machine executable instructions that perform a performance analysis of said at least one data storage device in accordance with said at least one data operation.

77. The computer readable medium of claim 76, wherein the at least one data storage device is included in a computer system, and the computer readable medium further comprising:

machine executable instructions that produce a swap plan in connection with performance of said at least one data storage system wherein the swap plan includes the modification, said swap plan indicating at least two portions of data of said at least one data storage device to be swapped.

78. The computer readable medium of claim 77, further comprising:

machine executable instructions that determine the modification using an optimizer.

79. The computer readable medium of claim 75, further comprising:

machine executable instructions that gather performance data about said at least one data storage device.

80. The computer readable medium of claim 77, further comprising:

machine executable instructions that store said performance data, wherein said performance data includes at least one base parameter and at least one derived parameter produced using said at least one base parameter.

81. The computer readable medium of claim 75, further comprising:

machine executable instructions that display one of a graphical representation and a tabular representation of said estimated performance machine executable instructions that receive a user input in response to said display; and machine executable instructions that determine whether to implement said modification in response to said user input.

\* \* \* \* \*

UNITED STATES PATENT AND TRADEMARK OFFICE
CERTIFICATE OF CORRECTION

PATENT NO.     : 6,622,221 B1
DATED          : September 16, 2003
INVENTOR(S)    : William Z. Zahavi It is certified that error appears in the above-identified patent and that said Letters Patent is hereby corrected as shown below:

Title page,
Item [63], Related U.S. Application Data, change "which is continuation-in-part of application No. 09/641,224, filed on Aug.17, 2000" to -- and is a continuation-in-part of application No. 09/641,224, filed on Aug. 17, 2000 --

Signed and Sealed this

Sixth Day of April, 2004

JON W. DUDAS
*Acting Director of the United States Patent and Trademark Office*